US012598398B2

(12) United States Patent
Yang et al.

(10) Patent No.: US 12,598,398 B2
(45) Date of Patent: Apr. 7, 2026

(54) TERMINAL DETECTION PLATFORM

(71) Applicants: Tyco Electronics (Shanghai) Co., Ltd., Shanghai (CN); TE Connectivity Services GmbH, Schaffhausen (CH)

(72) Inventors: An (Joshua) Yang, Shanghai (CN); Lei (Alex) Zhou, Shanghai (CN); Lvhai (Samuel) Hu, Shanghai (CN); Dandan (Emily) Zhang, Shanghai (CN); Roberto Francisco-Yi Lu, Bellevue, WA (US)

(73) Assignees: Tyco Electronics (Shanghai) Co., Ltd., Shanghai (CN); TE Connectivity Solutions GmbH, Schaffhausen (CH)

( * ) Notice: Subject to any disclaimer, the term of this patent is extended or adjusted under 35 U.S.C. 154(b) by 149 days.

(21) Appl. No.: 18/335,484

(22) PCT Filed: Dec. 7, 2021

(86) PCT No.: PCT/EP2021/084533
§ 371 (c)(1),
(2) Date: Jun. 15, 2023

(87) PCT Pub. No.: WO2022/128611
PCT Pub. Date: Jun. 23, 2022

(65) Prior Publication Data
US 2024/0314453 A1     Sep. 19, 2024

(30) Foreign Application Priority Data

Dec. 15, 2020    (CN) .......................... 202011470052.7

(51) Int. Cl.
*H04N 23/90*        (2023.01)
*G01B 11/14*        (2006.01)
*H04N 23/56*        (2023.01)

(52) U.S. Cl.
CPC ............. *H04N 23/90* (2023.01); *G01B 11/14* (2013.01); *H04N 23/56* (2023.01)

(58) Field of Classification Search
None
See application file for complete search history.

(56) References Cited

U.S. PATENT DOCUMENTS 4,553,843 A     11/1985  Langley et al.
4,704,700 A     11/1987  Linker et al.
(Continued)

FOREIGN PATENT DOCUMENTS

CN        102671870 A       9/2012
CN        204272515 U       4/2015
(Continued)

OTHER PUBLICATIONS

PCT Notification of Transmittal of the International Search Report and Written Opinion dated Mar. 23, 2022, corresponding to Application No. PCT/EP2021/084533, 13 pages.
(Continued)

*Primary Examiner* — Edemio Navas, Jr.
(74) *Attorney, Agent, or Firm* — Barley Snyder

(57) ABSTRACT

A terminal detection platform for detecting terminals on a terminal strip includes a base, a first and second feeding rail mounted on the base, and at least one detection mechanism installed on the base. The first feeding rail and the second feeding rail extend parallel to each other in a first direction to define a feeding channel therebetween through which the terminal strip carrying the terminals is conveyed along the first direction. At least one of the first feeding rail or the second feeding rail is movable relative to the base such that a width of the feeding channel in a second direction perpendicular to the first direction is adjustable. The at least one detection mechanism is adapted to detect the terminals on the terminal strip passing through the feeding channel to determine whether the terminals are qualified.

18 Claims, 7 Drawing Sheets

(56)     References Cited

U.S. PATENT DOCUMENTS

| | | | |
|---|---|---|---|
| 6,188,784 B1 * | 2/2001 | Linker, Jr. | ....... G01N 21/95684 |
| | | | 250/559.34 |
| 2006/0290779 A1 * | 12/2006 | Reverte | .................... E03F 7/10 |
| | | | 348/84 |
| 2019/0185182 A1 * | 6/2019 | Bei | ........................ F16M 11/10 |

FOREIGN PATENT DOCUMENTS

| | | | | |
|---|---|---|---|---|
| CN | 106938770 | A | 7/2017 | |
| CN | 209255648 | U | 8/2019 | |
| CN | 110342256 | A | 10/2019 | |
| CN | 211981114 | U | 11/2020 | |
| DE | 202020102770 | U1 | 8/2020 | |
| EP | 0124444 | A2 | 11/1984 | |
| JP | S6076134 | A | 4/1985 | |
| TW | I690094 | B | 4/2020 | |
| WO | WO-2020080025 | A1 * | 4/2020 | ............ G01N 23/04 |
| WO | 2021051809 | A1 | 3/2021 | |

OTHER PUBLICATIONS

Chinese First Office Action dated Aug. 30, 2023 with English translation, corresponding to Application No. 202011470052.7, 17 pages.

* cited by examiner

TERMINAL DETECTION PLATFORM

CROSS-REFERENCE TO RELATED APPLICATIONS

This application claims the benefit of PCT/EP2021/084533, filed on Dec. 7, 2021, which claims the benefit of Chinese Patent Application No. CN202011470052.7 filed on Dec. 15, 2020, in the State Intellectual Property Office of China, the whole disclosures of which are incorporated herein by reference.

FIELD OF THE INVENTION

The present invention generally relates to the field of object or product detection, and more specifically, to a terminal detection platform.

BACKGROUND

Generally, the terminals used for electrical connectors are formed by stamping, that is, the terminals are punched out on a metal strip by stamping machine or die. The punched terminals are transported together with the metal strip for subsequent treatment, such as terminal electroplating, after which the terminal installation/assembly process is carried out.

Before the installation/assembly of terminals, it is necessary to check the terminals after stamping or electroplating to determine whether there are unqualified terminals, which can be carried out on a strip terminal detection platform. However, there are different specifications (such as, different shapes, different sizes, etc.) of terminals used for electrical connectors. Conventional strip terminal detection platforms can only detect or adapt to a single specification of terminals, so the detection flexibility is poor.

SUMMARY

According to an aspect of the present invention, a terminal detection platform for detecting terminals on a terminal strip includes a base, a first and second feeding rail mounted on the base, and at least one detection mechanism installed on the base. The first feeding rail and the second feeding rail extend parallel to each other in a first direction to define a feeding channel therebetween through which the terminal strip carrying the terminals is conveyed along the first direction. At least one of the first feeding rail or the second feeding rail is movable relative to the base such that a width of the feeding channel in a second direction perpendicular to the first direction is adjustable. The at least one detection mechanism is adapted to detect the terminals on the terminal strip passing through the feeding channel to determine whether the terminals are qualified.

BRIEF DESCRIPTION OF THE DRAWINGS

The invention will now be described by way of example with reference to the accompanying figures, of which.

DETAILED DESCRIPTION OF THE EMBODIMENTS

Figure 1:
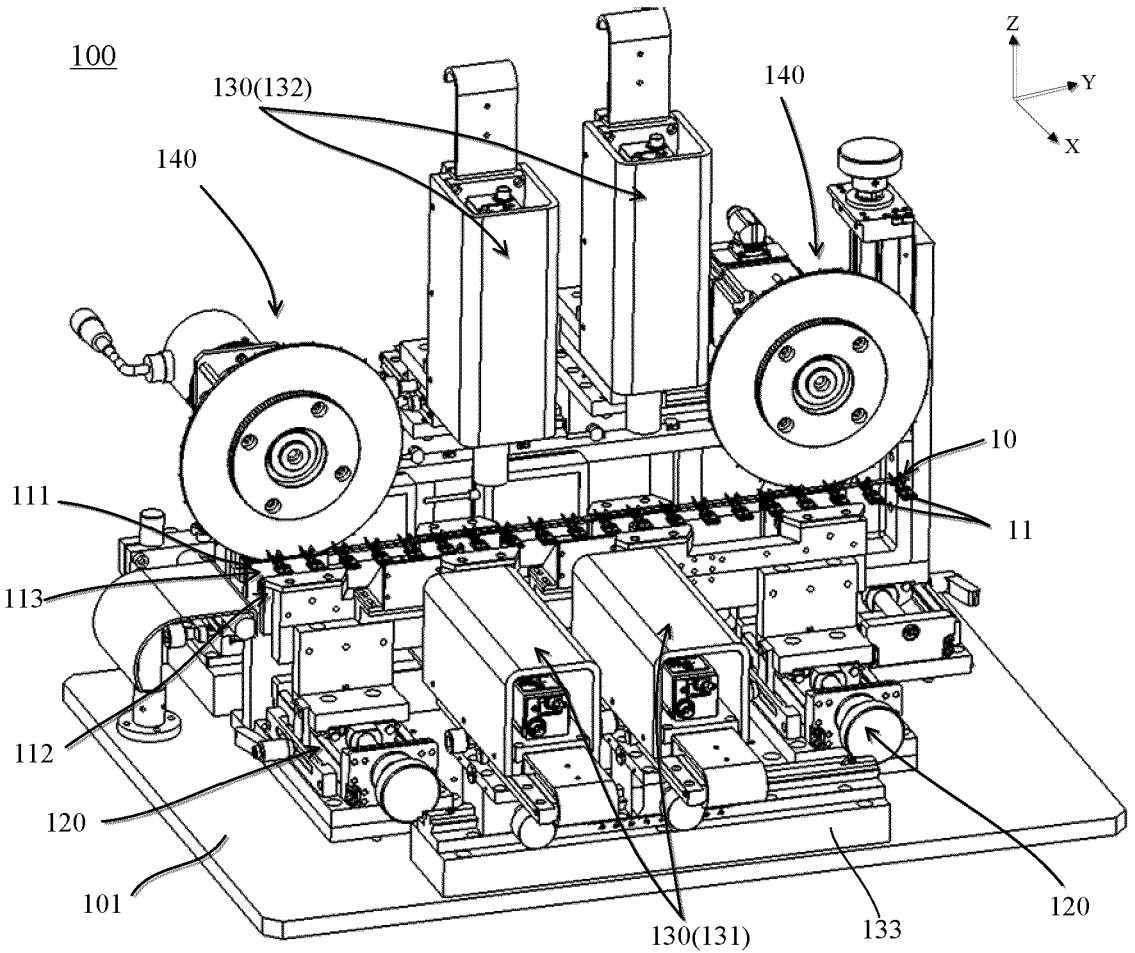
FIG. 1 is a perspective view schematically showing an arrangement of a terminal detection platform according to an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to an embodiment of the present invention, a terminal detection platform for detecting terminals on a terminal strip includes a base, a first feeding rail and a second feeding rail mounted on the base. The first feeding rail and the second feeding rail extend parallel to each other in a first direction to define a feeding channel between them. The terminal strip carrying the terminals is allowed to be conveyed through the feeding channel along the first direction. At least one detection mechanism is installed on the base and configured to detect the terminals on the terminal strip passing through the feeding channel to determine whether the terminals are qualified. At least one of the first feeding rail and the second feeding rail is configured to be movable relative to the base so that the width of the feeding channel in a second direction perpendicular to the first direction is adjustable.

As shown in the figures, according to the exemplary embodiment of the present invention, a terminal detection platform 100 is provided for detecting a plurality of terminals 11 on a terminal strip 10, for example, checking whether the terminals are qualified or defective. The terminal strip, for example, is formed by stamping and/or bending a metal strip with a press or a die. The terminal strip includes a carrier strip and a plurality of linearly arranged terminals connected to the bottom edge of the carrier strip, for example, the terminals extend transversely to the length direction of the carrier strip. These terminals are later cut off from the strip to form terminals of various electrical connectors. Subsequent operations may be required to form the electrical connector after stamping the terminal. These may include electroplating the terminal, encapsulating the terminal, or inserting the terminal into a molding mold for molding, and/or installing or assembling it into the insulation housing of the connector. Before these operations, the terminals 11 need to be checked to determine whether there are unqualified, which can be carried out on the strip terminal detection platform 100 according to an embodiment of the invention.

As shown in the figures, the strip terminal detection platform 100 according to an embodiment of the invention comprises a base 101, a feeding mechanism mounted on the base and at least one detection mechanism 130. The base 101 can be in the form of a flat plate, and can be fixed on a workbench, carrier or test equipment. The feeding mechanism is used to transport the terminal strip 10 with the terminals 11 through the strip terminal detection platform 100, so that the detection mechanism 130 can carry out appropriate detection operations on the terminal to determine whether the terminal is qualified. According to an embodiment of the invention, the feeding mechanism can be adjusted according to the specifications of the terminal strip to be transported or detected (for example, the shape, size, thickness, etc. of the terminal strip), so that the feeding mechanism can properly transport terminal strips of different specifications and the terminals carried thereon.

In an embodiment shown in the figures, the feeding mechanism includes a first feeding rail 111 and a second feeding rail 112 mounted on the base 101. The first feeding rail 111 and the second feeding rail 112 extend parallel to each other in the first direction to define a feeding channel 113 between them. The feeding rails 111,112 allow the terminal strip 10 carrying the terminals 11 to be conveyed through the feeding channel 113 in the first direction. The feeding rails 111,112 can partially support the terminal strip 10. In the drawings, the horizontal direction Y is taken as the first direction. The feeding channel 113 can limit the terminal strip 10 to avoid displacement, deformation or bending during conveying. As described below, the feeding channel 113 can be adjusted, such as adjusting its width to match the terminal strip 10 to be conveyed, so as to adapt to the detection of various terminals 11 of different shapes/sizes on the same platform 100.

In an exemplary embodiment of the present invention, at least one of the first feeding rail 111 and the second feeding rail 112 is movably mounted to the base 101, so that the spacing between the feeding rails and therefore the width P of the feed channel 113 can be adjusted, so as to be suitable for conveying various terminal strips 10 of different specifications therein. In the figures, the width direction of the feeding channel 113 is a horizontal second direction X perpendicular to the first direction Y, and the height direction Z of the platform 100 is perpendicular to the first direction Y and the second direction X. For example, at least one of the feeding rails 111,112 can be moved in the second direction X, or in any suitable direction, as long as the width of the feeding channel 113 can be adjusted appropriately. In addition, in other examples, the position of at least one of the feeding rails 111,112 in its length direction and/or height direction can also be adjusted to better adapt to different specifications of terminal strips 10.

Figure 2:
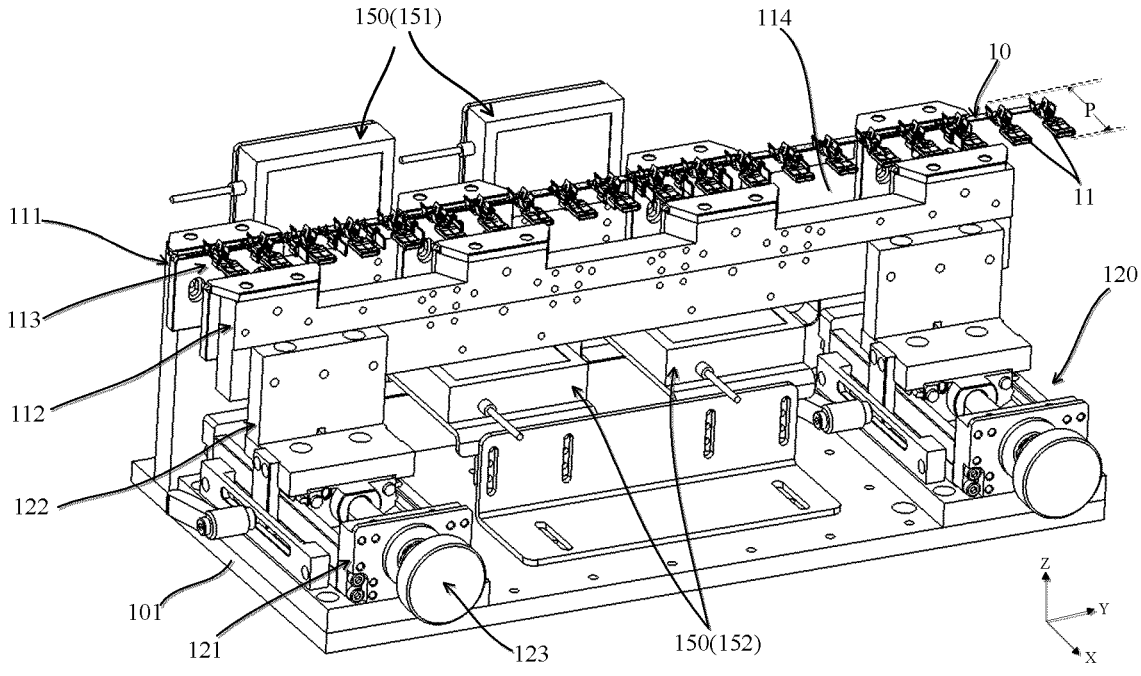
FIG. 2 is a perspective view schematically showing an arrangement of a terminal detection platform according to an exemplary embodiment of the present invention, in which a detection mechanism and a driving mechanism are removed.
Figure 3:
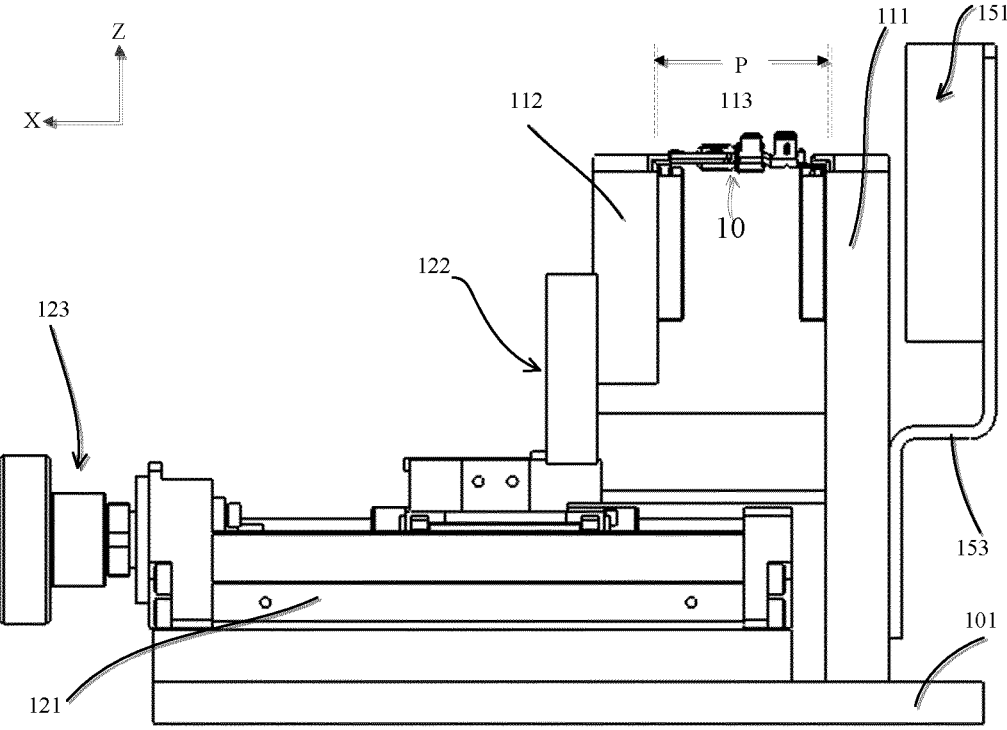
FIG. 3 is a cross-sectional view schematically showing an arrangement of a terminal detection platform according to an exemplary embodiment of the present invention.

Accordingly, as shown in FIGS. 1-3, the terminal detection platform 100 may also include a rail adjusting mechanism 120, which can move at least one of the first feeding rail 111 and the second feeding rail 112 relative to the base 101 to adjust the width of the feeding channel 113.

In the illustrated embodiment, the movement of the second feeding rail 112 is described as an example. For example, the rail adjusting mechanism 120 includes a first seat 121, a first bracket 122, and a first adjusting member 123. The first seat 121 is fixed relative to the base 101, for example, detachably mounted to the base 101 by screws. The first bracket 122 connects and supports the second feeding rail 112. The first bracket 122 is movably mounted to the first seat 121, for example, slidable relative to the first seat 121 or the base 101, for example, movable or slidable in the second direction X. Alternatively, by omitting the first seat 121, the first bracket 122 can be directly and movably mounted to the base 101. The first adjusting member 123 is connected to the first bracket 122 and can be operated to adjust the positions of the first bracket and the second feeding rail 112 relative to the first seat 121, thereby adjusting the position of the second feeding rail 112 relative to the first feeding rail 111 to adjust the width of the feeding channel 113.

For example, the first adjusting member 123 is in the form of an adjusting screw, which is rotatably mounted to the first seat 121 and connected to the first bracket 122. Rotating the adjusting screw can drive the first bracket 122 and the second feeding rail 112 to move away from or close to the first feeding rail 111 in the second direction. It can be understood that other suitable adjustment mechanisms can be used to move the feeding rail(s) 111,112, such as the motor driver, or the position of the feeding rail(s) can be adjusted manually. In addition, a locking mechanism can also be provided for fixing or maintaining the position of the feeding rail(s) 111,112 relative to the base 101 after the feeding rail(s) is/are moved in place.

Figure 4:
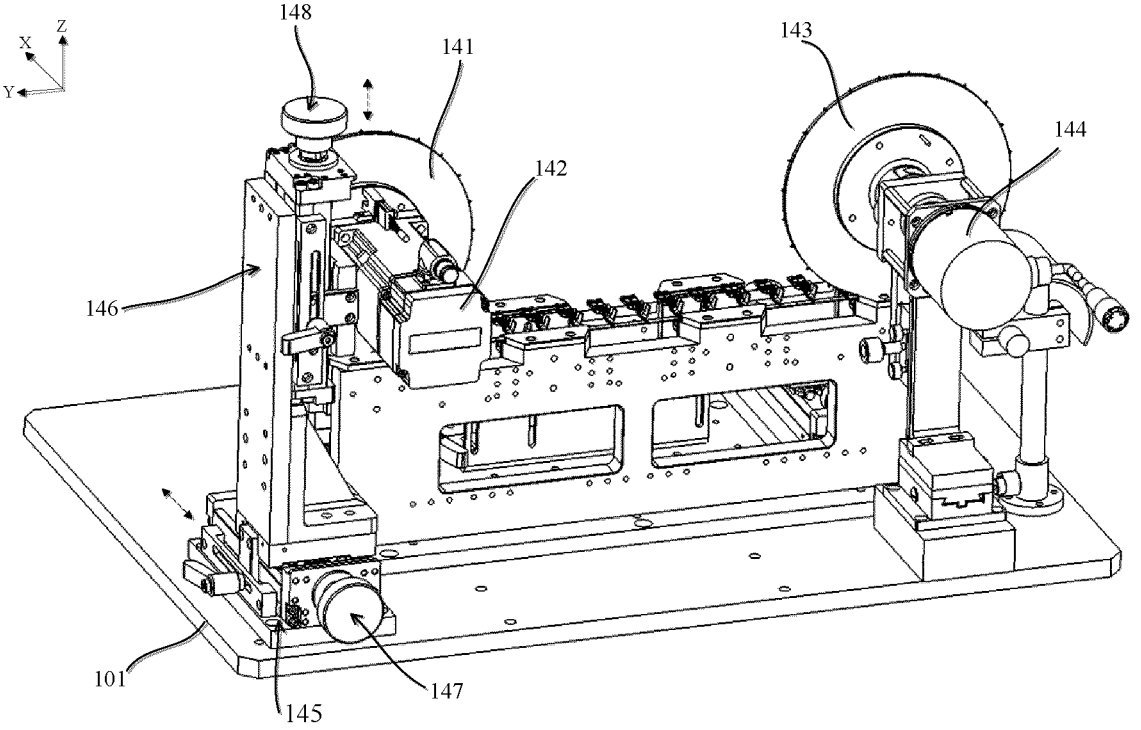
FIG. 4 is a perspective view schematically showing an arrangement of a terminal detection platform according to an exemplary embodiment of the present invention, in which a detection mechanism is removed.
Figure 6:
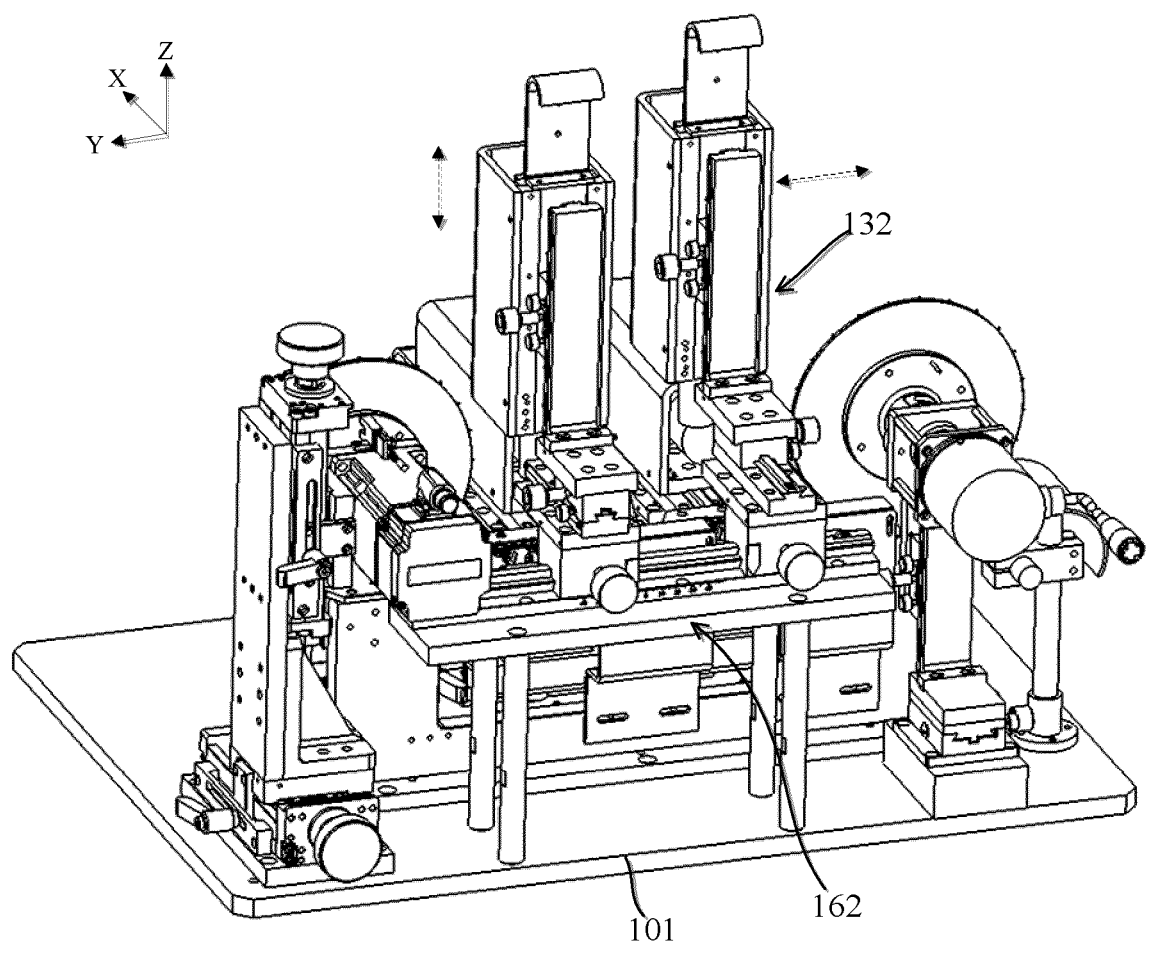
FIG. 6 is a perspective view schematically showing an arrangement of a terminal detection platform according to an exemplary embodiment of the present invention.

In some embodiments, as shown in FIGS. 1, 4 and 6, the terminal detection platform 100 may also include a driving mechanism 140 mounted on the base 101. The driving mechanism 140 can be used as a part of the feeding mechanism to drive the terminal strip 10 to move along the feeding channel 113. The driving mechanism 140 may include a first driving mechanism, for example, arranged at an outlet end of the feeding channel 113 to drive the terminal strip 10 to move along the feeding channel. As an alternative, the first driving mechanism can also be arranged at an inlet end of the feeding channel 113 to push the terminal strip 10 to move along the feeding channel.

As shown in the figures, the first driving mechanism includes a driving wheel 141 and a motor 142. The driving wheel 141 is arranged to engage with the terminal strip 10. For example, teeth on the driving wheel 141 are engaged with the holes in the terminal strip 10 so that the rotation of the driving wheel drives the terminal strip to move along the feeding channel 113. The motor 142 is connected to the drive wheel 141 to drive the drive wheel to rotate. For example, the operation of the motor 142 can be controlled to adjust at least one of conveying speed, conveying time, acceleration and stop time of the terminal strip 10, so as to realize controlled conveying and positioning detection of the terminals 11 of the terminal strip on the detection platform 100.

In the illustrated embodiment, the driving mechanism 140 may also include a second driving mechanism, for example, arranged at the inlet end of the feeding channel 113. In some examples, the second driving mechanism may include a driven wheel 143 and an encoder 144. The driven wheel 143 is arranged to engage with the terminal strip 10 so that the movement of the terminal strip along the feeding channel 113 drives the driven wheel to rotate. The encoder 144 is connected to the driven wheel 143, and the position of the terminal 11 on the terminal strip 10 can be determined based on the rotation of the driven wheel. The detection mechanism 130 can obtain the position and thus determine the position of the detected terminal 11, so as to accurately determine which terminal (or its part) is unqualified or defective.

In other examples, the second driving mechanism can be used as an auxiliary of the first driving mechanism, and also includes a driving wheel for driving the terminal strip to move along the feeding channel. Accordingly, an encoder connected to one or each driving wheel can be provided, which can determine the position of the terminal on the terminal strip based on the rotation of the driving wheel.

In some examples, the above driving mechanism 140 (for example, its driving wheel or driven wheel) can be replaced to adapt to different specifications of terminal strips.

According to the exemplary embodiment of the present invention, the positions of the first driving mechanism and/or the second driving mechanism can be adaptively adjusted according to the width of the feeding channel 113, so that the first driving mechanism and the second driving mechanism can be correctly engaged with the terminal strip 10 conveyed in the feeding channel. As an example, the driving mechanism 140 can be movably mounted on the base 101 through a frame. As shown in FIGS. 1, 4 and 6, the frame includes a second seat 145, a second bracket 146 and a second adjusting member 147. The second seat 145 is fixed to the base 101. The second bracket 146 is movably mounted to the second seat 145 and is connected to the corresponding driving mechanism 140 to support the corresponding driving mechanism. Alternatively, by omitting the second seat 145, the second bracket 146 can be directly and movably mounted to the base 101. The second adjusting member 147 is connected to the second bracket 146 and can be operated to adjust the positions of the second bracket and the corresponding driving mechanism 140 relative to the second seat 145 or the base 101 in the second direction X according to the width of the feeding channel 113.

The second adjusting member, for example, adopts the form of an adjusting screw, which can be rotatably installed on the second seat 145 and connected to the second bracket 146. Rotating the adjusting screw can drive the second bracket 146 and the corresponding driving mechanism 140 to move in the second direction. It can be understood that any other suitable adjustment mechanism can be used to move the second bracket 146, such as a motor driver, or the position of the second bracket can be adjusted manually. In addition, a locking mechanism can be provided for fixing or maintaining the position of the second bracket 146 relative to the base 101 after the second bracket is moved in place.

In addition, the height position of the driving mechanism 140 can be adjusted relative to the second bracket 146 or base 101 to adapt to the specifications of the detected terminal strip 10 or terminal 11. For example, as shown in FIG. 4, the driving mechanism 140 (141, 142; 143,144) is movably mounted on the second bracket 146, and the driving mechanism can be driven to move in the height direction to adjust its height position by another adjusting member 148.

In an embodiment of the present invention, the detection mechanism 130 can be independently installed on the base 101 relative to the feeding mechanism (feeding rail/driving mechanism), so as to avoid the adverse effect of the movement or vibration of the feeding mechanism on the detection of the detection mechanism.

In some exemplary embodiments, the detection mechanism 130 can be used to perform visual inspection/electrical characteristic detection and the like on the terminals 11 of the terminal strip 10 conveyed in the feeding channel 113. As an example of visual inspection, the detection mechanism 130 may include one or more image capture devices, such as a camera, for capturing an image of the terminal 11 of the terminal strip 10 conveyed in the feeding channel 113. For example, the posture, orientation or position of the image capture device can be adjusted so that images of the terminals 11 can be acquired at different angles. For example, the detection mechanism 130 may include a plurality of image capture devices positioned at different orientations to capture images of different parts of the terminal 11. Alternatively, the position of the detection mechanism 130 or its image capture device relative to the base can be adjusted to be suitable for detecting terminals 11 on different specifications of terminal strips 10. For example, the position of the detection mechanism 130 or its image capture device relative to the base in the second direction X can be adjusted according to the width of the feeding channel 113, or the posture or orientation of the detection mechanism or its image capture device can be adjusted. Providing a plurality of image capture devices can capture images of a larger area at one time, and the plurality of image capture devices can work together to check the same or different terminals 11 or terminal features, so as to speed up the inspection speed.

As shown in FIG. 1, the detection mechanism 130 may include a first image capture device 131 and a second image capture device 132. The first image capture device 131 faces the terminal 11 in a horizontal direction and captures an image of the terminal in the horizontal direction. The second image capture device 132 faces the terminal 11 in a vertical direction and captures an image of the terminal in the vertical direction. The first image capture device 131 and the second image capture device 132 are movably mounted on the base 101 so that their positions relative to the terminals 11 conveyed in the feeding channel are adjustable to be suitable for taking clear images of terminals with different specifications or at different positions. As shown in FIG. 2, the second feeding rail 112 is provided with a notch or a window 114 to allow the image capture device to capture an image of the terminal 11 through the notch or the window 114.

Figure 5:
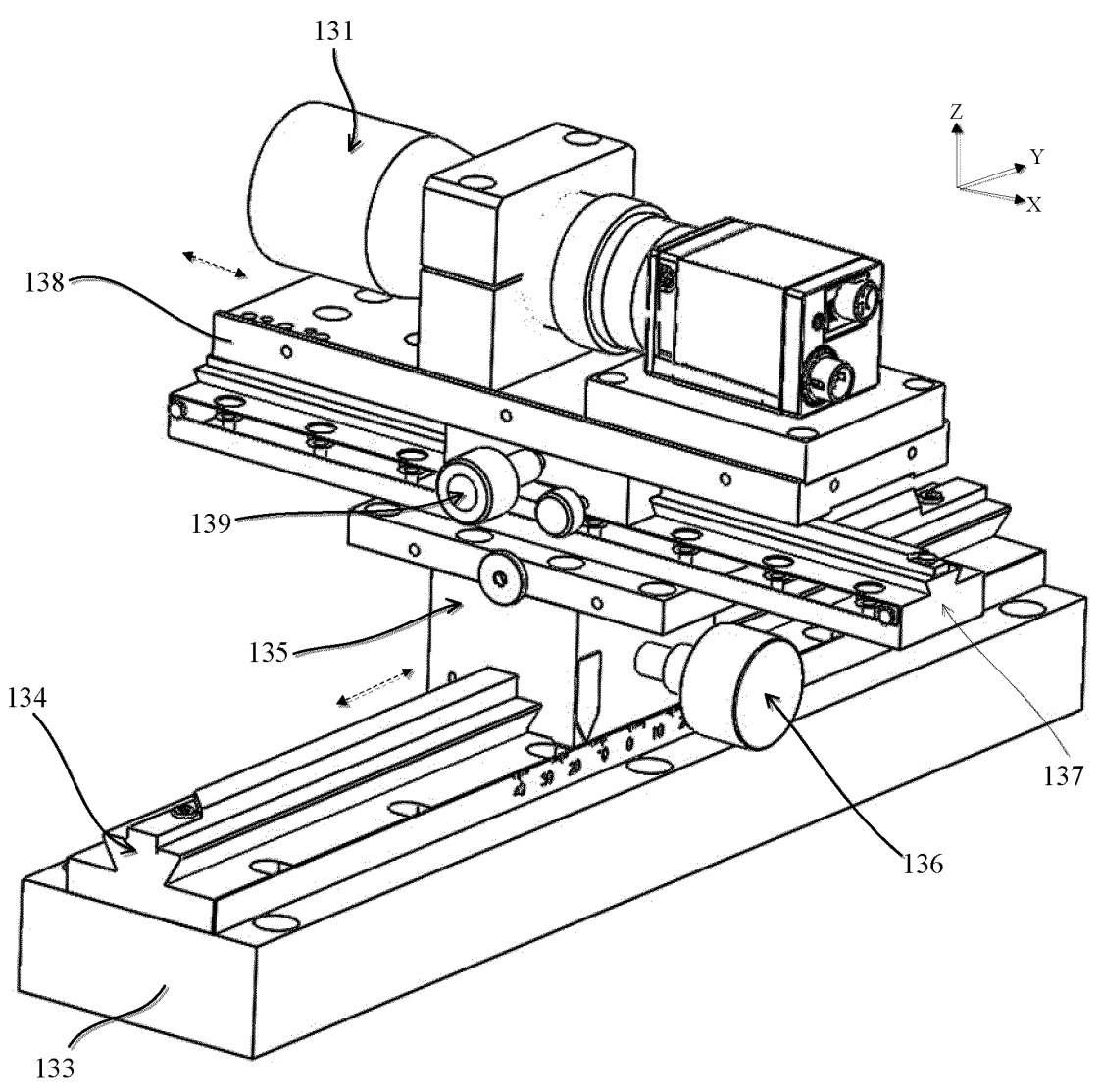
FIG. 5 is a perspective view schematically showing an image capture device and a moving mechanism of a terminal detection platform according to an exemplary embodiment of the present invention.

In the illustrated embodiment, in order to adjust the position of the first image capture device 131 relative to the terminal 11, a first moving mechanism is used to realize the movement of the first image capture device at least in the first direction Y or the second direction X. Specifically, as shown in FIG. 5, the first moving mechanism includes a first slide rail 134 extending in the first direction Y, a first sliding support 135 engaged with the first slide rail to be able to slide in the first direction, a second slide rail 137 arranged on the first sliding support 135 and extending in the second direction X, and a second sliding support 138 engaged with the second slide rail to be able to slide in the second direction. The first image capture device 131 is mounted on the second sliding support 138. The position of the first image capture device 131 is adjusted by sliding the first sliding support 135 and the second sliding support 138 on the corresponding slide rail. The first slide rail 134 can be directly fixed on the base 101, or can be arranged on a third seat 133 fixed on the base as shown in the figures. The third adjusting member 136 can realize the movement of the first sliding support 135 along the first slide rail 134, and the fourth adjusting member 139 can realize the movement of the second sliding support 138 along the second slide rail 137.

Figure 7:
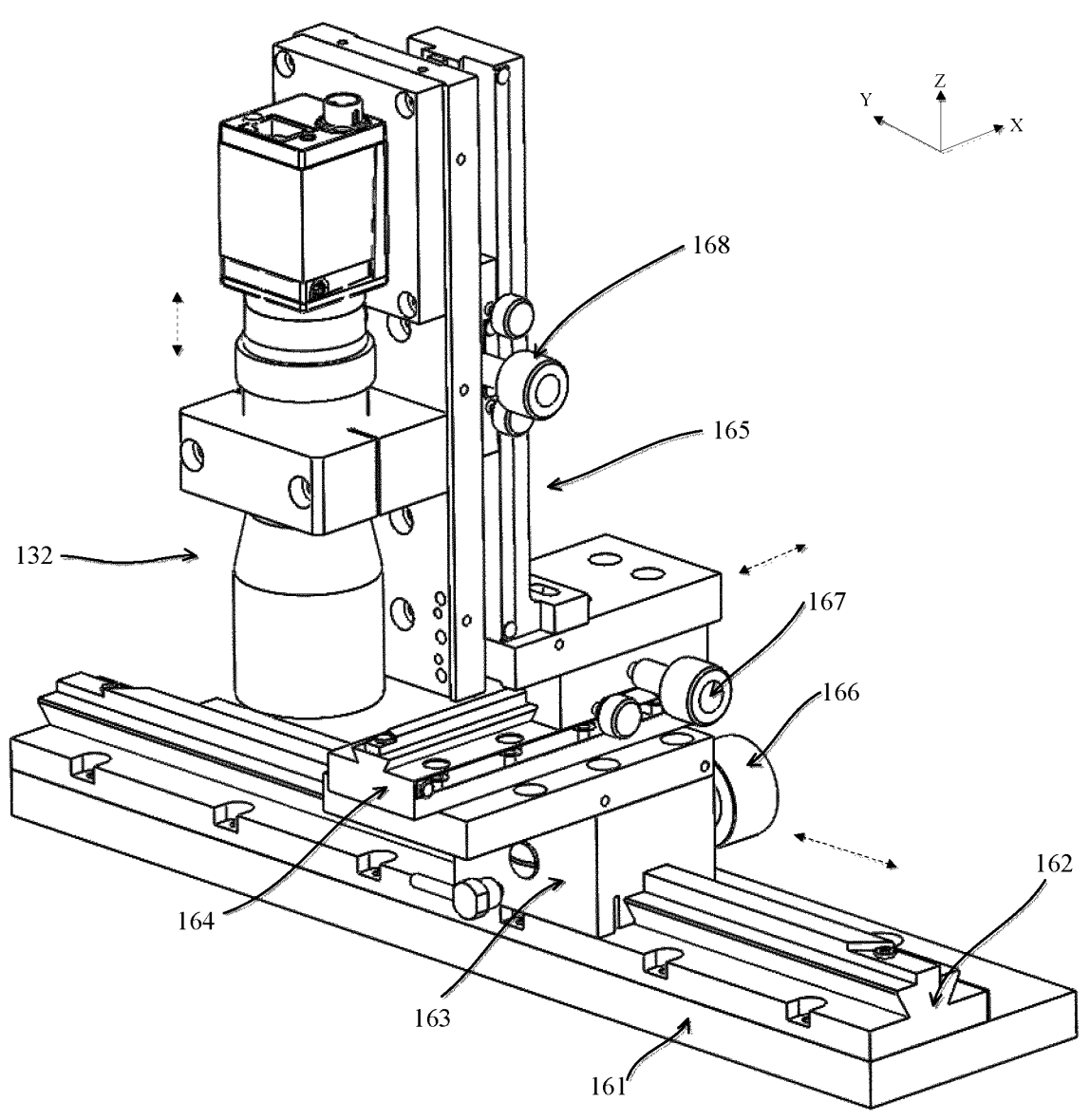
FIG. 7 is a perspective view schematically showing another image capture device and another moving mechanism of a terminal detection platform according to an exemplary embodiment of the present invention.

Similarly, in order to adjust the position of the second image capture device 132 relative to the terminal 11, the movement of the second image capture device 132 in at least the first direction Y, the second direction X, or the third direction Z is realized by a second moving mechanism. As shown in FIGS. 6 and 7, the second moving mechanism includes a third slide rail 162 extending in the first direction Y, a third sliding support 163 engaged with the third slide rail to be able to slide in the first direction Y, a fourth slide rail 164 arranged on the third sliding support 163 and extending in the second direction X, and a fourth sliding support 165 engaged with the fourth slide rail to be able to slide in the second direction. The second image capture device 132 is movably mounted to the fourth sliding support 165 in the third direction or height direction. The position adjustment of the second image capture device 132 can be realized by sliding the third sliding support 163 or the fourth sliding support 165 on the corresponding slide rail and/or by moving the second image capture device relative to the fourth sliding support. The third slide rail 162 can be directly fixed on the base 101, or can be arranged on a fourth seat 161 fixed on the base 101 as shown in the figures. The fifth adjusting member 166 can realize the movement of the third sliding support 163 along the third sliding rail 162, the sixth adjusting member 167 can realize the movement of the fourth sliding support 165 along the fourth sliding rail 164, and the seventh adjusting member 168 can realize the movement of the second image capture device 132 relative to the fourth sliding support.

It can be understood that in each moving mechanism, the extension direction of each slide rail can be interchanged, and therefore the sliding direction of the sliding support supported by each slide rail can be interchanged, and the extension direction or sliding direction can also be different from the first direction Y and the second direction X shown in the figures. It is also understood that the height position, orientation or shooting angle of the first or second image capture device can also be adjusted. A locking mechanism can also be provided to lock the position of the sliding support relative to the slide rail after it slides in place, so as to keep the state of the image capture device stable when capturing the image of the terminal.

As shown in FIGS. 1-3, the terminal detection platform 100 may also be provided with a backlight 150 for at least partially illuminating the terminal 11 to be captured by the image capture device, so as to obtain a clearer image. For example, as shown in the figures, a backlight 151 for the first image capture device 131 and a backlight 152 for the second image capture device 132 are provided. The backlight 151, 152 can be positioned relative to the corresponding image capture device 131,132, such as in front of the corresponding image capture device and on a side of the detected terminal opposite to the corresponding image capture device. Alternatively, the backlight 151,152 and the corresponding image capture device 131,132 are located on the same side of the detected terminal 11. As shown in FIG. 3, the backlight 151 is fixed to the feeding rail 111 through the bracket 153, but the present invention is not limited to this, and the backlight can be installed at any suitable position through any suitable structure.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A terminal detection platform for detecting terminals on a terminal strip, comprising:
   a base;
   a first feeding rail and a second feeding rail mounted on the base, the first feeding rail and the second feeding rail extend parallel to each other in a first direction to define a feeding channel therebetween through which the terminal strip carrying the terminals is conveyed along the first direction, at least one of the first feeding rail or the second feeding rail is movable relative to the base such that a width of the feeding channel in a second direction perpendicular to the first direction is adjustable;
   at least one detection mechanism installed on the base and adapted to detect the terminals on the terminal strip passing through the feeding channel to determine whether the terminals are qualified;
   a driving mechanism mounted on the base driving the terminal strip to move along the feeding channel, the driving mechanism is removable and replaceable, the driving mechanism accommodating different specifications of terminal strips; and
   a rail adjusting mechanism having a first seat fixed to the base and a first bracket connecting and supporting the second feeding rail, the first bracket is movably mounted to the first seat and is movable relative to the first seat.

2. The terminal detection platform according to claim 1, wherein the rail adjusting mechanism is adapted to move at least one of the first or second feeding rails relative to the base to adjust the width of the feeding channel.

3. The terminal detection platform according to claim 2, wherein the first adjusting member includes an adjusting screw which drives the first bracket and the second feeding rail to move in the second direction away from or toward the first feeding rail.

4. The terminal detection platform according to claim 1, wherein the driving mechanism comprises:
   a first driving mechanism arranged at an outlet end of the feeding channel and including:
      a driving wheel adapted to engage with and drive the terminal strip to move along the feeding channel by rotation; and
      a motor connected to the driving wheel to drive the driving wheel to rotate and adapted to adjust at least one of conveying speed, conveying time, acceleration and stopping time of the terminal strip; and a second driving mechanism arranged at an inlet end of the feeding channel and including:

a driven wheel adapted to engage with the terminal strip and be rotated by a movement of the terminal strip along the feeding channel; and an encoder connected to the driven wheel to determine a position of the terminal on the terminal strip according to the rotation of the driven wheel.

5. The terminal detection platform according to claim 4, wherein positions of the first driving mechanism and the second driving mechanism are adjustable according to the width of the feeding channel.

6. The terminal detection platform according to claim 5, wherein each of the first driving mechanism and the second driving mechanism is movably mounted on the base through a frame.

7. The terminal detection platform according to claim 6, wherein the frame includes:

a second bracket that connects and supports the corresponding driving mechanism and is movable relative to the base; and a second adjusting member connected to the second bracket and operable to adjust a position of the second bracket and the position of the corresponding driving mechanism relative to the base in the second direction according to the width of the feeding channel.

8. The terminal detection platform according to claim 1, wherein the at least one detection mechanism is independently mounted on the base relative to the first feeding rail and the second feeding rail, and includes an image capture device for capturing an image of the terminals on the terminal strip conveyed in the feeding channel.

9. The terminal detection platform according to claim 8, wherein the at least one detection mechanism comprises a plurality of image capture devices positioned at different orientations to capture images of different parts of the terminal.

10. The terminal detection platform according to claim 8, wherein a position of the at least one detection mechanism relative to the base is adjustable.

11. The terminal detection platform according to claim 10, wherein the position of the at least one detection mechanism relative to the base in the second direction is adjustable according to the width of the feeding channel.

12. The terminal detection platform according to claim 8, wherein the at least one detection mechanism includes at least one of:

a first image capture device movably mounted on the base and positioned to face the terminal in a horizontal direction to capture an image of the terminal in the horizontal direction; or a second image capture device movably mounted on the base and positioned to face the terminal in a vertical direction to capture an image of the terminal in the vertical direction.

13. The terminal detection platform according to claim 8, further comprising a backlight adapted to at least partially illuminate the terminal to be captured by the corresponding image capture device.

14. The terminal detection platform according to claim 2, wherein the rail adjusting mechanism further includes:

a first adjusting member connected to the first bracket, the first adjusting member adjusts positions of the first bracket and the second feeding rail relative to the first seat to adjust the width of the feeding channel.

15. A terminal detection platform, comprising:

a base;

a feeding channel having an adjustable width and adapted to receive a terminal strip including a plurality of terminals;

a first imagine capturing device movably mounted relative to the base in a width direction of the feeding channel and positioned to capture an image along a first direction of at least one of the plurality of terminals on the terminal strip passing through the feeding channel;

a driving mechanism mounted on the base driving the terminal strip to move along the feeding channel, the driving mechanism is removable and replaceable, the driving mechanism accommodating different specifications of terminal strips; and a rail adjusting mechanism having a first seat fixed to the base and a first bracket connecting and supporting a second feeding rail, the first bracket is movably mounted to the first seat and is movable relative to the first seat.

16. The terminal detection platform according to claim 15, further comprising a second image capturing device movably mounted relative to the base and positioned to capture an image of at least one of the plurality of terminals along a second direction, distinct from the first direction.

17. The terminal detection platform according to claim 15, further comprising a first driving mechanism arranged at an outlet end of the feeding channel and including a driving wheel adapted to engage with and drive the terminal strip to move along the feeding channel, and a motor connected to the driving wheel to drive the driving wheel to rotate.

18. The terminal detection platform according to claim 15, wherein the feeding channel is defined between a first feeding rail and the second feeding rail mounted on the base, at least one of the first feeding rail or the second feeding rail is movable relative to the base such that a width of the feeding channel is adjustable.

* * * * *